No. 771,443. PATENTED OCT. 4, 1904.
M. PERKIEWICZ.
COATING BRICKS AND APPARATUS THEREFOR.
APPLICATION FILED MAR. 7, 1904.
NO MODEL.

Witnesses.
J. K. Moore
P. H. Hubbard

Inventor.
Max Perkiewicz
By Whitaker Prevost attys

No. 771,443.

Patented October 4, 1904.

UNITED STATES PATENT OFFICE.

MAX PERKIEWICZ, OF LUDWIGSBERG, NEAR MOSCHIN, GERMANY.

COATING BRICKS AND APPARATUS THEREFOR.

SPECIFICATION forming part of Letters Patent No. 771,443, dated October 4, 1904.

Application filed March 7, 1904. Serial No. 196,917. (No model.)

*To all whom it may concern:*

Be it known that I, MAX PERKIEWICZ, a subject of the Emperor of Germany, residing at Ludwigsberg, near Moschin, Germany, have invented new and useful Improvements in Coating Bricks and in Apparatus Therefor, of which the following is a specification.

This invention relates to improvements in coating bricks and in apparatus therefor.

In the specification of my former patent, No. 740,040, I have described a protective coating for bricks of all kinds for the prevention of efflorescence and deposits. This protective coating is composed of a gelatin solution to which flour is added. Now I have found by further experiments that it is advisable to add to the liquid coating material (which instead of being composed of a mixture of gelatin and flour can be made of a separate gelatin or flour mixture) substances which prevent putrefaction. As examples of such substances I may mention carbolic acid, lysole, sublimate, and nitric acid. Furthermore, I have found that aluminium sulfate, tannic acid, or salts of chromium can be added to the coating material with approximately the same result. The application of the liquid coating to molded bricks which are not in the form of a continuous slab and have a shaped surface is not possible with apparatus as heretofore made, and I use for this purpose the apparatus hereinafter described, and illustrated in the accompanying drawings, in which—

Figure 1:
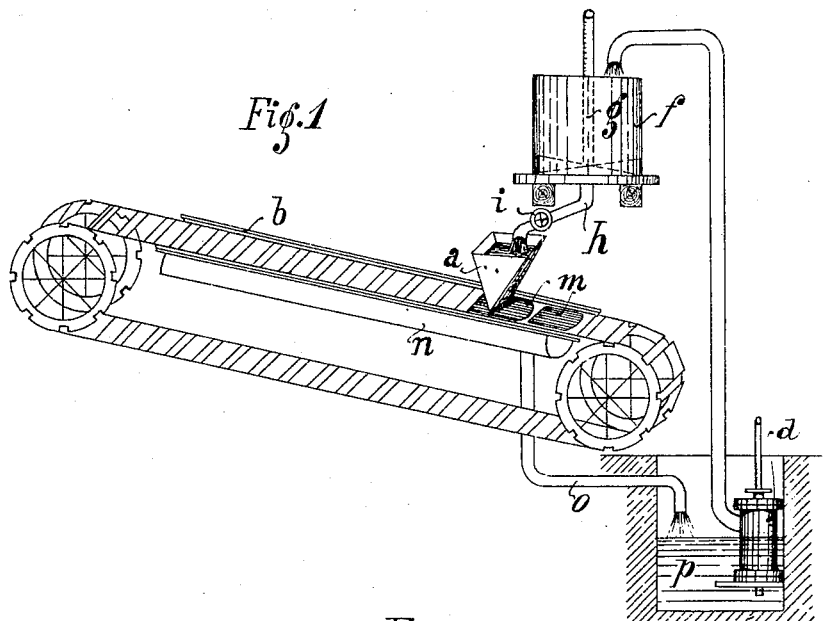
Figure 2:
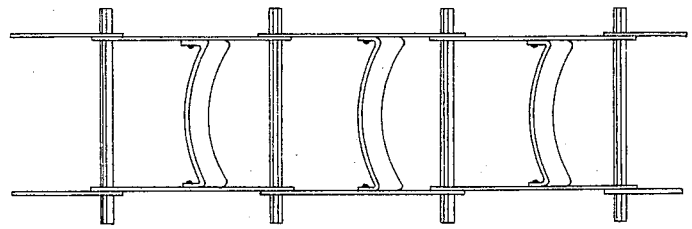
Figure 3:
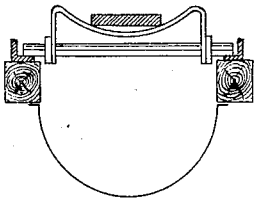
Figure 4:
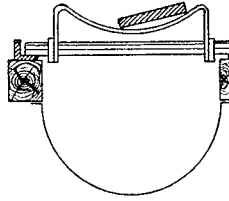

Figure 1 is a side view of the apparatus; and Figs. 2, 3, and 4 are views of a detail hereinafter described.

The apparatus comprises a chain conveyer arranged at an inclination to the horizontal and above which is located a distributing-box $a$ for the coating material. The distributing-box $a$ is provided with fine perforations or slits at the bottom. Below the upper part of the conveyer is fitted the collecting-trough $n$, which receives the superfluous coating material as it drops from the brick.

The operation of the apparatus is as follows: The bricks $m$, laid upon the inclined conveyer, pass under the distributing-box $a$, and their upper surfaces are covered with the liquid coating. The material is fed into the distributing-box $a$ from the tank $f$ through the pipe $h$, the said pipe $h$ being provided with a valve $i$ and the tank $f$ being furnished with a stirring device $g$. The superfluous liquid coating which drops from the bricks runs into the trough $n$, whence it flows away through the overflow $o$ into the well $p$. From this well it can be raised by a suction or pressure pump $d$ to the feed-tank $f$. The slats $b$ serve for guiding the conveyer-chain. In some cases the superfluous liquid which flows from the collecting-trough $n$ through the pipe $o$ is advantageously passed through a sieve before it reaches the well in order to free it of impurities. Furthermore, the said well $p$ can be provided with stirring mechanism.

In order to be able to coat bricks which have projections or recesses at an angle to the longitudinal axis of the conveyer, it must be arranged that the coating material can run off the bricks without collecting in the recesses therein. This is effected by arranging the axes of the conveyer at an inclination, so that the coating or glazing applied to the bricks cannot only flow to the lower end of the conveyer, but can also quickly escape laterally. The lateral escape of the coating can, however, be effected by any other suitable means—as, for example, that illustrated in Figs. 2, 3, and 4, which show a form of conveyer having concave-shaped supports. This arrangement has the advantage that the brick can be placed directly upon the supports at a greater or less inclination, according to the size of the projecting or recessed portions which it possesses.

Having now particularly described and ascertained the nature of my said invention and in what manner the same is to be performed, I declare that what I claim is—

1. The process of coating bricks which consists in moving the bricks progressively and maintaining them in an inclined position transversely with respect to their direction of movement and applying a liquid compound to said bricks from a point above their line of travel, while said bricks are in motion, substantially as described.

2. The process of coating bricks which consists in moving the bricks progressively and maintaining them in an inclined position transversely with respect to their direction of movement, and applying a liquid compound to said bricks from a point above their line of travel, while said bricks are in motion, collecting the surplus compound drained off of said bricks and forcing it up to the point of distribution above the bricks to be used over again, substantially as described.

3. The process of coating bricks which consists in moving the bricks progressively and maintaining them in an angular position both transversely and longitudinally with respect to the direction of their movement, to permit them to drain and applying a liquid compound to said bricks while moving and in such inclined position, substantially as described.

MAX PERKIEWICZ.

Witnesses:
HENRY HASPER,
WOLDEMAR HAUPT.